United States Patent
Cook et al.

(10) Patent No.: US 10,685,457 B2
(45) Date of Patent: Jun. 16, 2020

(54) SYSTEMS AND METHODS FOR VISUALIZING EYEWEAR ON A USER

(71) Applicant: Vision Service Plan, Rancho Cordova, CA (US)

(72) Inventors: Andrew Cook, El Dorado Hills, CA (US); Patrick V. Crain, Elk Grove, CA (US)

(73) Assignee: Vision Service Plan, Rancho Cordova, CA (US)

( * ) Notice: Subject to any disclaimer, the term of this patent is extended or adjusted under 35 U.S.C. 154(b) by 0 days.

(21) Appl. No.: 16/191,979

(22) Filed: Nov. 15, 2018

(65) Prior Publication Data

US 2020/0160556 A1 May 21, 2020

(51) Int. Cl.
| G06T 7/73 | (2017.01) |
| G06T 15/20 | (2011.01) |
| G06T 7/50 | (2017.01) |
| G02C 13/00 | (2006.01) |

(52) U.S. Cl.
CPC .............. *G06T 7/74* (2017.01); *G02C 13/003* (2013.01); *G06T 7/50* (2017.01); *G06T 15/205* (2013.01)

(58) Field of Classification Search
CPC ........... G06T 7/74; G06T 7/50; G06T 15/205; G02C 13/003
See application file for complete search history.

(56) References Cited

U.S. PATENT DOCUMENTS

| 4,762,407 A | 8/1988 | Anger et al. |
| 4,852,184 A | 7/1989 | Tamura et al. |
| 4,991,005 A | 2/1991 | Smith |
| 5,175,941 A | 1/1993 | Ziegler et al. |
| 5,400,522 A | 3/1995 | Kremer et al. |
| 5,592,248 A | 1/1997 | Norton et al. |
| 5,615,486 A | 4/1997 | Igarashi et al. |
| 5,983,201 A * | 11/1999 | Fay ...................... G02C 13/003 705/26.5 |
| 6,095,650 A | 8/2000 | Gao et al. |
| 6,142,628 A | 11/2000 | Saigo |
| 6,231,188 B1 | 5/2001 | Gao et al. |

(Continued)

FOREIGN PATENT DOCUMENTS

| DE | 19752729 | 6/1999 |
| KR | 20040097200 | 11/2004 |

(Continued)

OTHER PUBLICATIONS

Huang et al., "Human-centric design personalization of 3D glasses frame in markerless augmented reality", Advanced Engineering Informatics 26 (2012) 35-45, 11 pages.

(Continued)

*Primary Examiner* — Ming Y Hon

(74) *Attorney, Agent, or Firm* — Brient IP Law, LLC

(57) ABSTRACT

An eyewear fit visualization system and method enable a user to visualize the fit and look of eyewear on the user's face without physically wearing the eyewear. An image of a user's face is converted to a three-dimensional map that is used to determine contact points of the eyewear to the user's face. Using these contact points, the system and method displays the eyewear precisely in place on a reflected or displayed image of the user's face to accurately simulate the look and fit of the eyewear.

24 Claims, 10 Drawing Sheets

(56) References Cited

U.S. PATENT DOCUMENTS

| | | |
|---|---|---|
| 6,508,553 B2 | 1/2003 | Gao et al. |
| 6,533,418 B1 | 3/2003 | Izumitani et al. |
| 6,535,223 B1 | 3/2003 | Foley |
| 6,583,792 B2 | 6/2003 | Agnew |
| 6,624,843 B2 | 9/2003 | Lennon |
| 6,634,754 B2 | 10/2003 | Fukuma et al. |
| 6,682,195 B2 | 1/2004 | Dreher |
| 6,692,127 B2 | 2/2004 | Abitbol et al. |
| 6,736,506 B2 | 5/2004 | Izumitani et al. |
| 6,791,584 B1 | 9/2004 | Xie |
| 6,792,401 B1 | 9/2004 | Nigro et al. |
| 6,944,327 B1 | 9/2005 | Soatto |
| 6,965,385 B2 | 11/2005 | Welk et al. |
| 7,010,146 B2 | 3/2006 | Fukuma et al. |
| 7,062,454 B1 | 6/2006 | Giannini et al. |
| 7,152,976 B2 | 12/2006 | Fukuma et al. |
| 7,222,091 B2 | 5/2007 | Yoshida |
| 7,274,806 B2 | 9/2007 | Fukuma et al. |
| 7,292,713 B2 | 11/2007 | Fukuma et al. |
| 7,665,843 B2 | 2/2010 | Xie |
| 7,845,797 B2 | 12/2010 | Warden et al. |
| 7,959,287 B1 | 6/2011 | Saffra |
| 8,142,017 B2 | 3/2012 | Drobe et al. |
| 8,220,922 B2 | 7/2012 | Chauveau et al. |
| 8,220,923 B2 | 7/2012 | Saffra |
| 8,231,220 B2 | 7/2012 | Baranton |
| 8,459,792 B2 | 6/2013 | Wilson et al. |
| 8,506,078 B2 | 8/2013 | Chauveau et al. |
| 8,556,420 B2 | 10/2013 | Sayag |
| 8,655,053 B1 | 2/2014 | Hansen |
| 8,690,326 B2 | 4/2014 | Wilson et al. |
| 8,733,936 B1 | 5/2014 | Kornilov et al. |
| 8,919,955 B2 | 12/2014 | Hsieh et al. |
| 8,959,781 B2 | 2/2015 | Delort |
| 9,058,765 B1 | 6/2015 | Mallick et al. |
| 9,086,582 B1 | 7/2015 | Barton |
| 9,091,867 B1 | 7/2015 | Farache |
| 9,164,299 B2 | 10/2015 | Fisher et al. |
| 9,198,576 B1 | 12/2015 | Barnes et al. |
| 9,236,024 B2 | 1/2016 | Coon |
| 9,254,081 B2 | 2/2016 | Kornilov et al. |
| 9,265,414 B2 | 2/2016 | Wilson et al. |
| 9,341,867 B1 | 5/2016 | Kim |
| 9,395,562 B1 | 7/2016 | Nguyen et al. |
| 9,418,378 B2 | 8/2016 | Staicut et al. |
| 9,429,773 B2 | 8/2016 | Ben-Shahar |
| 9,467,630 B2 | 10/2016 | Dotan et al. |
| 9,529,213 B2 | 12/2016 | Fonte et al. |
| 9,557,583 B2 | 1/2017 | Farache |
| 9,568,748 B2 | 2/2017 | Kim |
| 9,569,890 B2 | 2/2017 | Choukroun |
| 9,645,413 B2 | 5/2017 | Aikawa |
| 9,665,984 B2 | 5/2017 | Ye et al. |
| 9,703,123 B2 | 7/2017 | Fonte et al. |
| 9,799,064 B2 | 10/2017 | Ohnemus et al. |
| 9,810,927 B1 | 11/2017 | Fenton et al. |
| 9,842,246 B2 | 12/2017 | Surkov et al. |
| 9,858,719 B2 | 1/2018 | Dorner et al. |
| 9,885,887 B2 | 2/2018 | Gardner |
| 9,990,780 B2 | 6/2018 | Kornilov et al. |
| 10,013,796 B2 | 7/2018 | Kornilov et al. |
| 10,031,350 B2 | 7/2018 | Fonte |
| 10,042,188 B2 | 8/2018 | Ritt et al. |
| 10,043,068 B1 | 8/2018 | Hansen |
| 10,043,207 B2 | 8/2018 | Inoue et al. |
| 10,048,516 B2 | 8/2018 | Liang |
| 10,067,361 B2 | 9/2018 | Ozaki et al. |
| 10,082,682 B2 | 9/2018 | Liang |
| 10,108,847 B2 | 10/2018 | Arikawa et al. |
| 10,120,207 B2 | 11/2018 | Le Gallou et al. |
| 10,121,189 B2 | 11/2018 | Adeyoola et al. |
| 10,130,252 B2 | 11/2018 | Chuang et al. |
| 10,156,740 B2 | 12/2018 | Tadokoro et al. |
| 10,194,799 B2 | 2/2019 | Gerrans |
| 10,216,010 B2 | 2/2019 | Tiemann et al. |
| 10,222,636 B2 | 3/2019 | Barton |
| 10,311,755 B2 | 6/2019 | Kenderes |
| 10,330,958 B2 | 6/2019 | Fonte et al. |
| 10,331,111 B2 | 6/2019 | Cluckers et al. |
| 10,339,581 B2 | 7/2019 | Kirschner et al. |
| 10,360,731 B2 | 7/2019 | Zhang |
| 10,386,657 B2 | 8/2019 | El-Hajal et al. |
| 2001/0023413 A1 | 9/2001 | Fukuma et al. |
| 2001/0042028 A1 | 11/2001 | Yoshida |
| 2002/0093515 A1 | 7/2002 | Fay et al. |
| 2002/0105530 A1* | 8/2002 | Waupotitsch ........ G02C 13/003 345/630 |
| 2002/0196333 A1* | 12/2002 | Gorischek ............ A45D 44/005 348/61 |
| 2003/0063105 A1* | 4/2003 | Agnew .................. G06T 11/60 345/660 |
| 2004/0004633 A1 | 1/2004 | Perry et al. |
| 2005/0162419 A1 | 7/2005 | Kim et al. |
| 2005/0175234 A1 | 8/2005 | Sakamoto |
| 2005/0190264 A1 | 9/2005 | Neal |
| 2007/0244722 A1 | 10/2007 | Wortz et al. |
| 2008/0040080 A1* | 2/2008 | Bae ........................ G06F 17/50 703/1 |
| 2008/0198328 A1 | 8/2008 | Seriani et al. |
| 2008/0201641 A1 | 8/2008 | Xie |
| 2011/0071804 A1 | 3/2011 | Xie |
| 2012/0016763 A1 | 1/2012 | Kirschner |
| 2012/0079377 A1* | 3/2012 | Goossens ............ G06F 3/04815 715/706 |
| 2013/0006814 A1 | 1/2013 | Inoue et al. |
| 2013/0088490 A1 | 4/2013 | Rasmussen et al. |
| 2013/0132898 A1 | 5/2013 | Cuento |
| 2013/0141694 A1 | 6/2013 | Seriani |
| 2013/0262259 A1 | 10/2013 | Xie et al. |
| 2014/0104568 A1* | 4/2014 | Cuta ...................... G02C 7/027 351/204 |
| 2014/0253707 A1 | 9/2014 | Gangadhar |
| 2014/0270370 A1* | 9/2014 | Saito .................... G06K 9/6253 382/103 |
| 2014/0363059 A1 | 12/2014 | Hurewitz |
| 2015/0055085 A1* | 2/2015 | Fonte ...................... G06F 16/22 351/178 |
| 2015/0061166 A1 | 3/2015 | Van De Vrie et al. |
| 2015/0070650 A1 | 3/2015 | Seriani |
| 2015/0127132 A1 | 5/2015 | Nyong et al. |
| 2015/0127363 A1 | 5/2015 | Nyong et al. |
| 2015/0277155 A1 | 10/2015 | Raviv |
| 2015/0293382 A1* | 10/2015 | Jethmalani .......... G02C 13/003 351/204 |
| 2015/0310519 A1 | 10/2015 | Gura et al. |
| 2015/0363853 A1* | 12/2015 | Werzer ................ G06Q 30/0621 705/26.5 |
| 2016/0162965 A1 | 6/2016 | Lee et al. |
| 2016/0171596 A1 | 6/2016 | Angerbauer et al. |
| 2016/0178936 A1* | 6/2016 | Yang ...................... G06T 17/00 351/246 |
| 2016/0292917 A1* | 10/2016 | Dorner ................ G03B 21/2053 |
| 2016/0317025 A1* | 11/2016 | Lee ........................ A61B 3/032 |
| 2016/0327811 A1 | 11/2016 | Haddadi et al. |
| 2016/0371539 A1* | 12/2016 | Ming .................... G06K 9/00268 |
| 2017/0169501 A1 | 6/2017 | Xia |
| 2017/0213385 A1* | 7/2017 | Yu ........................ G06K 9/4604 |
| 2017/0270574 A1 | 9/2017 | Hessurg |
| 2018/0017815 A1 | 1/2018 | Chumbley et al. |
| 2018/0067340 A1 | 3/2018 | Chumbley et al. |
| 2018/0149886 A1 | 5/2018 | Zweerts et al. |
| 2018/0218442 A1 | 8/2018 | McKechnie et al. |
| 2018/0239173 A1 | 8/2018 | Cuento |
| 2018/0252942 A1 | 9/2018 | Gamliel et al. |
| 2018/0268458 A1 | 9/2018 | Popa et al. |
| 2018/0336720 A1 | 11/2018 | Larkins et al. |
| 2018/0336737 A1* | 11/2018 | Varady ................. G06T 7/536 |
| 2018/0374261 A1 | 12/2018 | Kornilov et al. |
| 2019/0033624 A1 | 1/2019 | Breuninger et al. |
| 2019/0108687 A1 | 4/2019 | Kelly et al. |

(56) References Cited

U.S. PATENT DOCUMENTS

FOREIGN PATENT DOCUMENTS

| | | |
|---|---|---|
| WO | 1993013447 | 7/1993 |
| WO | 1997029441 | 8/1997 |
| WO | 1998027861 | 7/1998 |
| WO | 1998057270 | 12/1998 |
| WO | 1999040526 | 8/1999 |
| WO | 2000016683 | 3/2000 |
| WO | 2001032074 | 5/2001 |
| WO | 2001035338 | 5/2001 |
| WO | 2001079918 | 10/2001 |
| WO | 2001088654 | 11/2001 |
| WO | 2001097683 | 12/2001 |
| WO | 2001098730 | 12/2001 |
| WO | 2001098862 | 12/2001 |
| WO | 2002065199 | 8/2002 |
| WO | 2003079097 | 9/2003 |
| WO | 2003081536 | 10/2003 |
| WO | 2005029158 | 3/2005 |
| WO | 2005038511 | 4/2005 |
| WO | 2007012261 | 2/2007 |
| WO | 2008032173 | 3/2008 |
| WO | 2008049173 | 5/2008 |
| WO | 2008129168 | 10/2008 |
| WO | 2009024681 | 2/2009 |
| WO | 2009044080 | 4/2009 |
| WO | 2009138879 | 11/2009 |
| WO | 2010042990 | 4/2010 |
| WO | 2010119190 | 10/2010 |
| WO | 2011067478 | 6/2011 |
| WO | 2011139366 | 11/2011 |
| WO | 2012022380 | 2/2012 |
| WO | 2012054983 | 5/2012 |
| WO | 2013149891 | 10/2013 |
| WO | 2014048199 | 4/2014 |
| WO | 2014062468 | 4/2014 |
| WO | 2014077462 | 5/2014 |
| WO | 2014128361 | 8/2014 |
| WO | 2014164347 | 10/2014 |
| WO | 2015011286 | 1/2015 |
| WO | 2015023667 | 2/2015 |
| WO | 2015046466 | 4/2015 |
| WO | 2015052571 | 4/2015 |
| WO | 2015101737 | 7/2015 |
| WO | 2015101738 | 7/2015 |
| WO | 2015151097 | 10/2015 |
| WO | 2015157505 | 10/2015 |
| WO | 2015166048 | 11/2015 |
| WO | 2015192733 | 12/2015 |
| WO | 2016026570 | 2/2016 |
| WO | 2016030620 | 3/2016 |
| WO | 2016041536 | 3/2016 |
| WO | 2016109884 | 7/2016 |
| WO | 2016118169 | 7/2016 |
| WO | 2016125798 | 8/2016 |
| WO | 2016126656 | 8/2016 |
| WO | 2016135078 | 9/2016 |
| WO | 2016142668 | 9/2016 |
| WO | 2016145021 | 9/2016 |
| WO | 2016164859 | 10/2016 |
| WO | 2016176630 | 11/2016 |
| WO | 2016189551 | 12/2016 |
| WO | 2016195488 | 12/2016 |
| WO | 2017042612 | 3/2017 |
| WO | 2017042824 | 3/2017 |
| WO | 2017077279 | 5/2017 |
| WO | 2017149180 | 9/2017 |
| WO | 2017174525 | 10/2017 |
| WO | 2017181257 | 10/2017 |
| WO | 2017196948 | 11/2017 |
| WO | 2017205903 | 12/2017 |
| WO | 2018106241 | 6/2018 |
| WO | 2018106242 | 6/2018 |
| WO | 2018130291 | 7/2018 |
| WO | 2018154271 | 8/2018 |
| WO | 20180191784 | 10/2018 |
| WO | 2018199890 | 11/2018 |
| WO | 2018209967 | 11/2018 |
| WO | 2018220203 | 12/2018 |
| WO | 2018224655 | 12/2018 |
| WO | 2019007939 | 1/2019 |
| WO | 2019020521 | 1/2019 |
| WO | 2019075526 | 4/2019 |

OTHER PUBLICATIONS

Topology: Custom-Tailored Eyewear "Glasses for every one face, not everyone's face", https://www.topologyeyewear.com, 11 pages.
Ditto: Secret's out on our 3D virtual try-on, http://blog.ditto.com, 11 pages.
New Hampshire Business Review, Internet helps customers 'try on' eyeglass frames, Dec. 29, 2000, Business Publications, Inc., 2 pages.
PR Newswire, "Geometrix Partners With Visionix Ltd to Provide 3D Face Capture and Virtual Try Eyewear Market", PR Newswire [New York] 20 Aug. 2001, 3 pages.

* cited by examiner

SYSTEMS AND METHODS FOR VISUALIZING EYEWEAR ON A USER

BACKGROUND

Buying eyewear can be a daunting task for many individuals given the sheer number of frame styles available. Many individuals only purchase one or two pairs of eyewear for daily use. Because the eyewear is often worn during all waking hours, the frames must be both comfortable and visually appealing to the wearer. As a result, eyewear manufacturers provide many selections corresponding to all conceivable design preferences and budgets.

Opticians and other physical stores, outlets, and boutiques maintain physical inventories of frames for consumers to try on before purchasing. However, storage space and showroom space is typically limited, restricting the number of frames that are available for try on and purchase. Additionally, consumers may not have the time or desire to physically browse through significant quantities of frames, pick them up, try them on in front of a mirror, and replace them before repeating the process innumerable times.

Virtual try on technology exists that allows a user to see an image of themselves on a display that will superimpose eyewear onto the user's face. However, conventional virtual try on technology does not provide the user with a realistic experience that adequately simulates the user's appearance with the virtual eyewear properly positioned and secured to the user's face. Rather, using existing virtual try on technology, when the user moves his or her head too fast, the virtual frames often float out of place or become unglued from the proper positioning on the user's face.

Moreover, conventional virtual try on experiences often do not properly place the eyewear on the user's image. The precise dimensions of an individual's face, including three-dimensional measurements and positioning of the individual's eyes, nose, and ears in relation to one another has a profound effect on the positioning and fit of eyewear. The same eyewear may rest in different places on different individuals, creating significant differences in the fit and resulting appearance of the eyewear on each of the individuals' faces. Existing virtual try on systems simply superimpose images of eyewear on a user's face according to a fixed position of the user's eyes or other specific attribute, which does not accurately depict the actual positioning of the physical eyewear on the user's face according to the precise dimensions and three-dimensional aspects of the user's features.

Accordingly, there is a need for improved systems and methods that address these and other needs.

SUMMARY

It should be appreciated that this Summary is provided to introduce a selection of concepts in a simplified form that are further described below in the Detailed Description. This Summary is not intended to be used to limit the scope of the claimed subject matter.

According to a first aspect of the disclosure, a computer-implemented method provides an eyewear visualization experience. The method includes receiving an image of the user's face that is positioned a distance from a first side of a viewing surface of a visualization device. The image of the user's face is used to create a three-dimensional map of the user's face. The three-dimensional map includes a positioning of features of the user's face according to three-dimensional measurements associated with the features of the user's face. An image of eyewear is received and used with the three-dimensional map of the user's face to determine an eyewear placement position. The eyewear placement position corresponds to a positioning of a visualized image of the user's face on the first side of the viewing surface. The image of the eyewear is displayed on a display that is positioned a distance from a second side of the viewing surface. The image of the eyewear is displayed at the eyewear placement position on the visualized image of the user's face.

According to another aspect, an eyewear visualization system is provided. The eyewear visualization system includes a visualization device, at least one camera, a display and a processor. The visualization device has a viewing surface that is at least partially reflective and at least partially transmissive, with a first side and a second side opposite the first side. The camera is configured to capture an image of a user's face that is positioned a distance from the first side of the viewing surface. The display is positioned adjacent to and a distance from the second side of the viewing surface. The processor is communicatively coupled to the camera and the display and is operative to receive the image of the user's face from the camera and use the image to create a three-dimensional map of the image. The three-dimensional map includes a positioning of the features of the user's face according to three-dimensional measurements associated with the features. The processor is further operative to receive an image of the eyewear and use the image and the three-dimensional map of the image of the user's face to determine an eyewear placement position. The eyewear placement position corresponds to a positioning of a reflected image of the user's face on the first side of the viewing surface. The processor displays the image of the eyewear on the display at the eyewear placement position.

According to yet another aspect, an eyewear visualization system is provided. The system includes a visualization device, at least one camera, a display and a processor. The visualization device has a screen with a first side and a second side opposite the first side. The camera is configured to capture an image of a user's face that is positioned a distance from the first side of the viewing surface. The display is positioned adjacent to and a distance from the second side of the viewing surface. The processor is communicatively coupled to the camera and the display and is operative to receive the image of the user's face from the camera. The processor uses the image to create a three-dimensional map of the image of the user's face. The three-dimensional map includes a positioning of the features of the user's face according to three-dimensional measurements associated with the features. The processor receives an image of the eyewear and uses the image and the three-dimensional map of the image of the user's face to determine an eyewear placement position corresponding to a positioning of a reflected image of the user's face on the first side of the viewing surface. The processor displays the image of the eyewear on the display at the eyewear placement position.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

Various embodiments of systems and methods for providing an enhanced eyewear fit visualization experience are described below. In the course of this description, reference will be made to the accompanying drawings, which are not necessarily drawn to scale and wherein.

DETAILED DESCRIPTION OF SOME EMBODIMENTS

Figure 1:
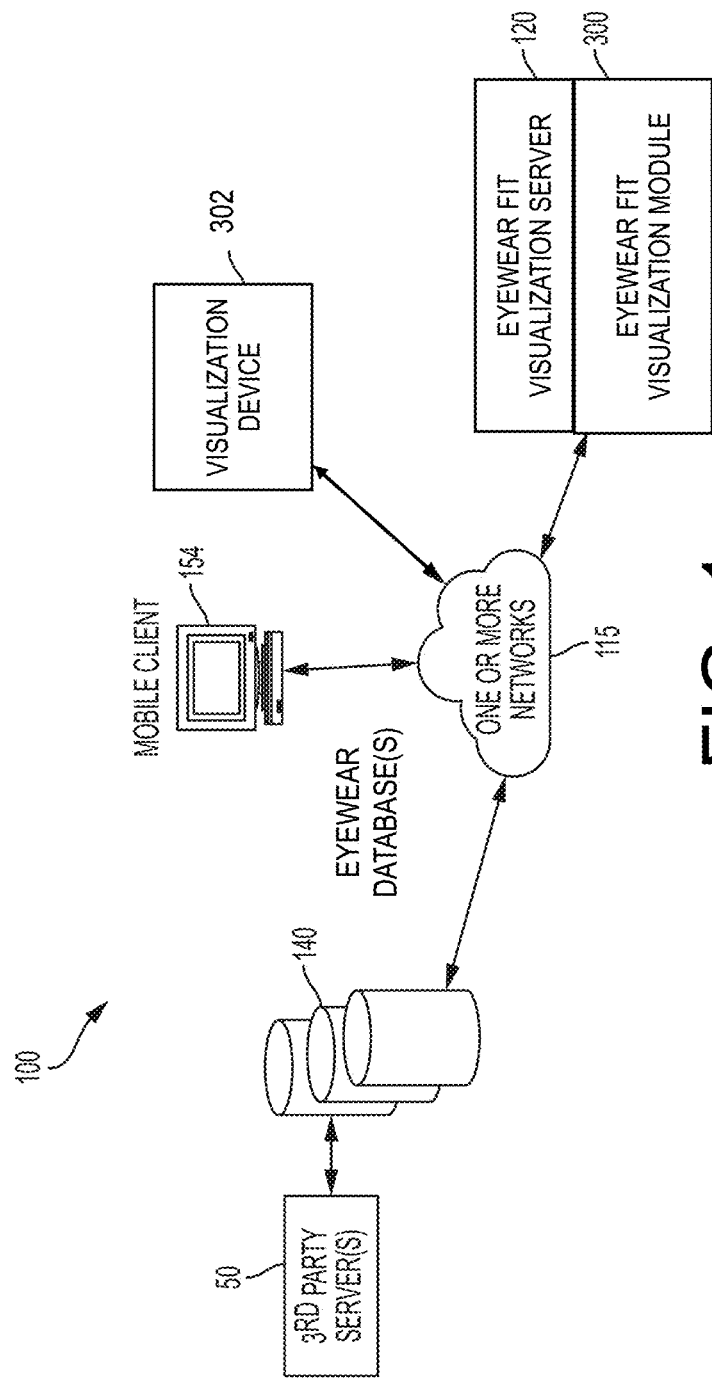
FIG. 1 is a block diagram of an eyewear fit visualization system in accordance with various embodiments of the disclosure provided herein.

Various embodiments will now be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Eyewear is an extremely personal product that may be as unique as the person wearing the eyewear, often emulating personality or lifestyle traits of the wearer. People prefer different colors, styles, materials, weight, and price points. There are virtually unlimited choices of eyewear to select from when purchasing new eyewear. When a person buys new eyewear, he or she typically visits a brick and mortar business and browses through tens or hundreds of pairs of frames before selecting a subset of those frames to try on. After selecting hopeful frames, the person usually stands in front of a mirror and tries the eyewear on to determine whether or not the look and feel are desirable. This process is repeated many times before the choices are narrowed down to the eyewear to be purchased. While any particular eyewear boutique or business may showcase hundreds of eyewear selections, the potential number of selections is limited by inventory space.

Utilizing the concepts and technologies described herein, these challenges are overcome through the use of an eyewear fit visualization system. According to various embodiments, the eyewear fit visualization system provides the user with a screen or mirror on which the user may view his or her real-time image. The eyewear fit visualization system then provides a realistic depiction of any selected eyewear in place over the user's image to simulate the user's image wearing the selected eyewear. The fit of the eyewear is precise due to a three-dimensional mapping of the user's face created by the eyewear fit visualization system. This three-dimensional map of the user's face, coupled with three-dimensional maps of the eyewear stored within one or more associated databases, provides detailed measurements of the user's face and corresponding eyewear that allows the system described herein to accurately calculate contact points of the eyewear with the user's face. Using these contact points, the system realistically displays the eyewear in the precise position on the displayed or reflected image of the user's face to show the user how he or she will look in the eyewear. The system further monitors movement of the user to smoothly track the corresponding movement of the eyewear being displayed so that the virtual frames do not float out of place or become unglued from the proper positioning on the user's face.

According to various embodiments, the eyewear fit visualization system described herein utilizes a visualization device with a viewing surface that is partially reflective and partially transmissive. A display is positioned behind the visualization device on the opposite side from the first side that is viewed by the user. The user is able to see his or her reflection in the first side of the viewing surface. Images displayed on the display are also visible from the first side of the viewing surface. In this manner, images of eyewear that are precisely displayed according to a configuration and positioning of the user's image being reflected in the viewing surface are visible in place on the user's face as if being worn by the user. Three-dimensional measurement and mapping techniques are utilized to locate an accurate eyewear placement position on the user's image. Any movement of the eyewear image to match corresponding movement of the user is produced by modification of the image being displayed and/or forward or backward movement of the display with respect to the viewing surface.

According to other embodiments, the eyewear fit visualization system described herein utilizes a screen with a display positioned behind the screen. The system utilizes a camera to provide a real-time image of the user on the display. Three-dimensional measurement and mapping techniques are used to determine contact points of the selected eyewear with the user's facial features. Images of the eyewear are provided with the real-time image of the user. The eyewear image is provided at the accurate eyewear placement position on the user's face according to the determined contact points. The system smoothly modifies the image of the eyewear according to the real-time movement of the user.

Exemplary Technical Platforms

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of Internet-implemented computer software. Any suitable computer-readable storage medium may be utilized including, for example, hard disks, compact disks, DVDs, optical storage devices, and/or magnetic storage devices.

Various embodiments are described below with reference to block diagram and flowchart illustrations of methods, apparatuses, (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus that can direct a computer or other programmable data processing apparatus to function in a particular manner such that the instructions stored in the computer-readable memory produce an article of manufacture that is configured for implementing the functions specified in the flowchart block or blocks.

The computer instructions may execute entirely on the user's computer, partly on the user's computer, as a stand-alone software package, partly on a user's computer and partly on a remote computer, or entirely on the remote computer or server. In the latter scenario, the remote computer may be connected to the user's computer through any suitable type of network, including but not limited to: a local area network (LAN); a wide area network (WAN), such as the Internet; and/or a cellular network.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer-implemented process (e.g., method) such that the instructions that execute on the computer or other programmable apparatus provide steps for implementing the functions specified in the flowchart block or blocks.

Example System Architecture

FIG. 1 is a block diagram of an eyewear fit visualization system 100 according to particular embodiments. As may be understood from this figure, the eyewear fit visualization system 100 may include one or more networks 115, one or more third party servers 50, an eyewear fit visualization server 120 that may, for example, be adapted to execute an eyewear fit visualization module 300, one or more databases 140, one or more remote computing devices 154 (e.g., a smart phone, a tablet computer, a wearable computing device, a laptop computer, a desktop computer, etc.), and one or more visualization devices 302, which as will be described in greater detail below may, for example, be embodied as a reflective and transmissive surface or a screen used in combination with a display. In particular embodiments, the one or more computer networks 115 facilitate communication between the one or more third party servers 50, the eyewear fit visualization server 120, the one or more databases 140, the one or more remote computing devices 154, and the one or more visualization devices 302.

The one or more networks 115 may include any of a variety of types of wired or wireless computer networks such as the Internet (or other WAN), a private intranet, a mesh network, a public switch telephone network (PSTN), and/or any other type of network (e.g., a network that uses Bluetooth or near field communications to facilitate communication between computing devices). The communication link between the one or more remote computing devices 154 and the eyewear fit visualization server 120 may be, for example, implemented via a local area network (LAN) or via the Internet (or other WAN).

Figure 2:
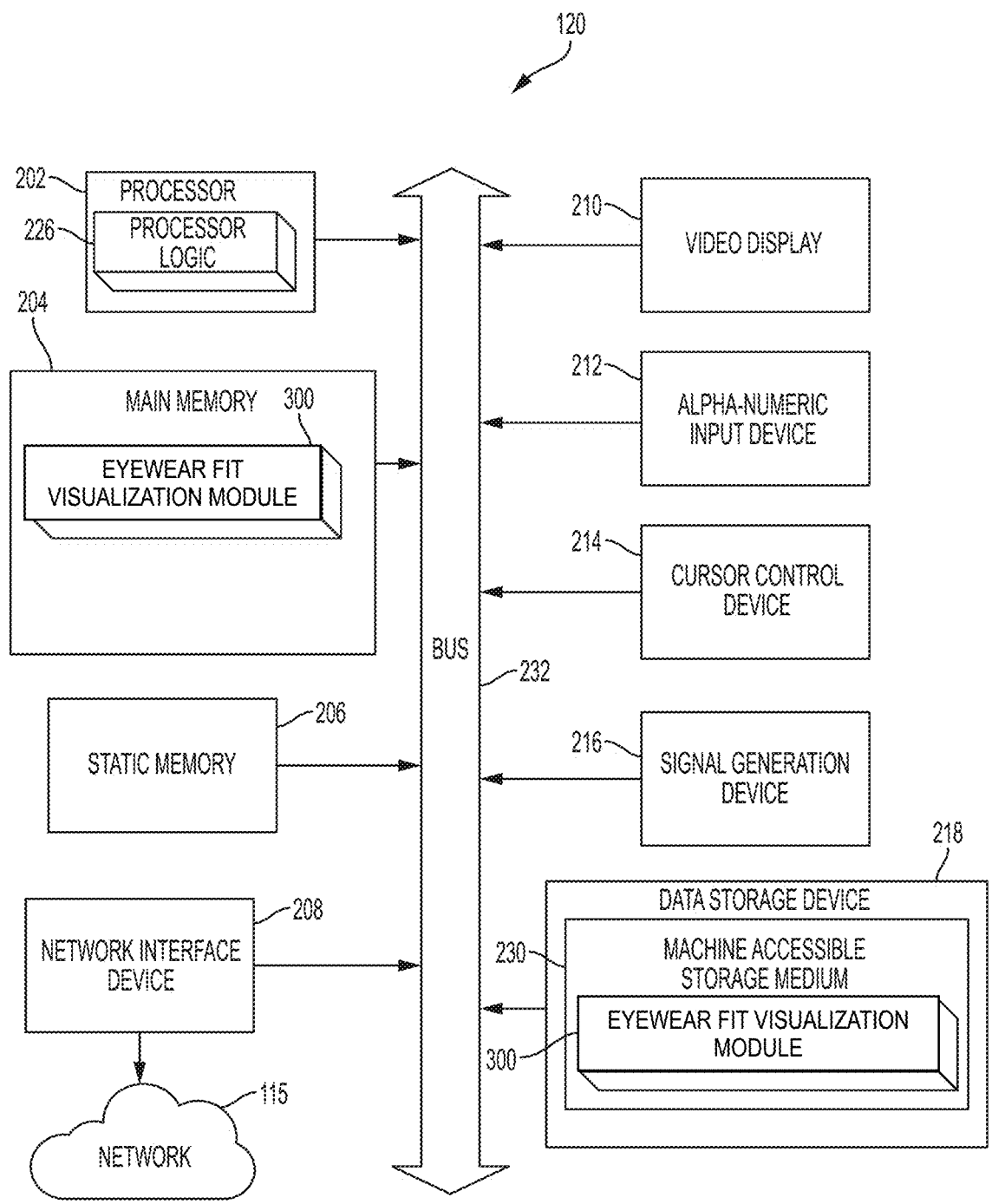
FIG. 2 is a block diagram of the eyewear fit visualization server of FIG. 1.

FIG. 2 illustrates a diagrammatic representation of an exemplary architecture of an eyewear fit visualization server 120 that may be used within various embodiments of the eyewear fit visualization system 100. It should be understood that the computer architecture shown in FIG. 2 may also represent the computer architecture for any one of the one or more remote computing devices 154, one or more third party servers 50, and/or the visualization device 302 shown in FIG. 1. In particular embodiments, the eyewear fit visualization server 120 may be suitable for use as a computer within the context of the eyewear fit visualization system 100 that is configured to provide a realistic display of the eyewear in the precise position on the displayed or reflected image of the user's face on the viewing surface to show the user how he or she will look in the eyewear. In other particular embodiments, the visualization device 302 may include an on-board computer processor that is adapted to execute an eyewear fit visualization module 300 to simulate the eyewear being worn by the wearer.

In particular embodiments, the eyewear fit visualization server 120 may be connected (e.g., networked) to other computing devices in a LAN, an intranet, an extranet, and/or the Internet as shown in FIG. 1. As noted above, the eyewear fit visualization server 120 may operate in the capacity of a server or a client computing device in a client-server network environment, or as a peer computing device in a peer-to-peer (or distributed) network environment. The eyewear fit visualization server 120 may be a desktop personal computing device (PC), a tablet PC, a set-top box (STB), a Personal Digital Assistant (PDA), a smartphone, a web appliance, a network router, a switch or bridge, or any other computing device capable of executing a set of instructions (sequential or otherwise) that specify actions to be taken by that computing device. Further, while only a single computing device is illustrated, the term "computing device" shall also be interpreted to include any collection of computing devices that individually or jointly execute a set (or multiple sets) of instructions to perform any one or more of the methodologies discussed herein, or other suitable methodologies.

As shown in FIG. 2, an exemplary eyewear fit visualization server 120 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose or specific processing devices such as a microprocessor, a central processing unit (CPU), or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The eyewear fit visualization server 120 may further include a network interface device 208. The eyewear fit visualization server 120 may also include a video display unit 210 (e.g., a liquid crystal display (LCD) or a cathode ray tube (CRT)), an alpha-numeric input device 212 (e.g., a keyboard), a cursor control device 214 (e.g., a mouse), a signal generation device 216 (e.g., a speaker), and a data storage device 218.

The data storage device 218 may include a non-transitory computing device-accessible storage medium 230 (also known as a non-transitory computing device-readable storage medium, a non-transitory computing device-readable medium, or a non-transitory computer-readable medium) on which is stored one or more sets of instructions (e.g., the eyewear fit visualization module 300) embodying any one or more of the methodologies or functions described herein. The one or more sets of instructions may also reside, completely or at least partially, within the main memory 204 and/or within the processing device 202 during execution thereof by the eyewear fit visualization server 120—the main memory 204 and the processing device 202 also constituting computing device-accessible storage media. The one or more sets of instructions may further be transmitted or received over a network 115 via a network interface device 208.

While the computing device-accessible storage medium 230 is shown in an exemplary embodiment to be a single medium, the term "computing device-accessible storage medium" should be understood to include a single medium or multiple media (e.g., a centralized or distributed database, and/or associated caches and servers) that store the one or more sets of instructions. The term "computing device-accessible storage medium" should also be understood to include any medium that is capable of storing, encoding, or carrying a set of instructions for execution by the computing device and that causes the computing device to include any one or more of the methodologies of the present invention. The terms "computing device-accessible storage medium" and like terms should accordingly be understood to include, but not be limited to, solid-state memories, optical and magnetic media, etc.

Exemplary Visualization Devices

Figure 3A:
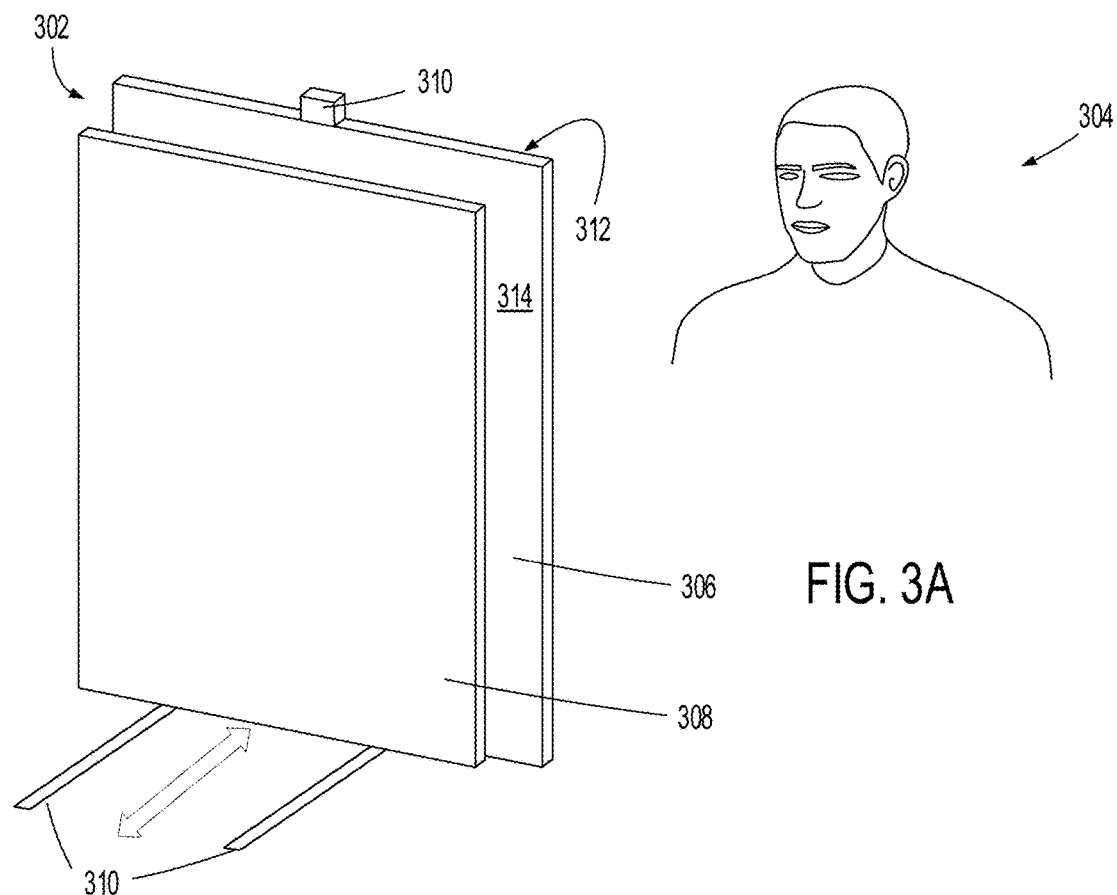
FIGS. 3A and 3B are rear and front perspective views, respectively, of a visualization device according to one embodiment of the disclosure provided herein.
Figure 3B:
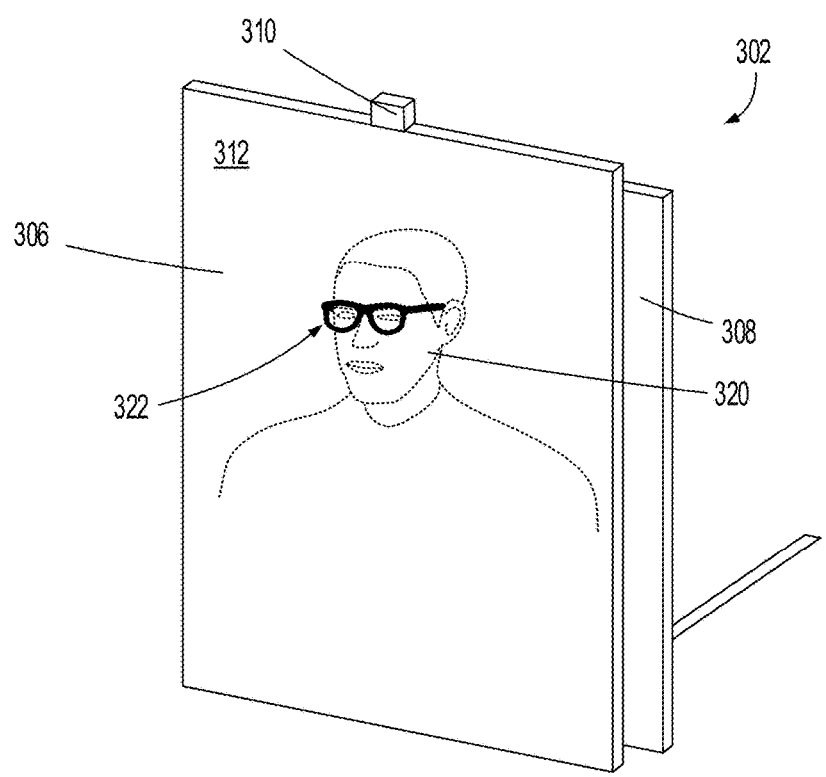

As shown in FIG. 1, the eyewear fit visualization system 100 includes a visualization device 302. One embodiment of a visualization device 302 is shown in FIGS. 3A and 3B. FIG. 3A shows a rear perspective view of a visualization device 302. The visualization device 302 includes a viewing surface 306 having a first side 312 and a second side 314 opposite the first side 312. According to this example, the viewing surface 306 includes a material that is both reflective and transmissive, allowing a user 304 to view a reflection in the first side 312 while also viewing one or more images provided by a display 308 positioned proximate to the second side 314. FIG. 3B shows a front perspective view of the visualization device 302 of FIG. 3A showing the reflected image, or visualized image 320, of the user 304 with an image of the eyewear 322 in place.

With this viewing surface 306, the eyewear fit visualization system 100 presents an image of eyewear in a position on the display 308 that corresponds with the precise eyewear placement position 322 on the visualized image 320 of the user's face on the first side 312 of the viewing surface 306. Because the image of the eyewear provided on the display 308 at the second side 314 of the viewing surface 306 is brighter than the light reflected on the first side 312 of the viewing surface 306 at the eyewear placement position, the user 304 sees the eyewear on the visualized image 320 as if being worn by the user 304. With the visualization device 302, the user 304 may "wear" any quantity and type of eyewear without moving from the visualization device 302.

As will be described in greater detail below, the eyewear fit visualization system 100 determines the eyewear placement position 322, including the size and orientation of the image of the eyewear to display at the eyewear placement position, utilizing the distance of the user 304 from the first side 312 of the viewing surface 306 and the distance of the display 308 from the second side 314 of the viewing surface 306. According to one embodiment, the distance between the display 308 and the second side 314 of the viewing surface 306 is fixed such that the display 308 is adjacent or proximate to the viewing surface 306. In these embodiments, the eyewear fit visualization module 300 controls the characteristics of the displayed image of the eyewear (e.g., brightness, size, orientation) via the lighting elements in the display 308. For example, as the user 304 changes the distance between the user 304 and the viewing surface 306, the eyewear fit visualization module 300 detects the change and alters the lighting elements in the display 308 to compensate for any size and orientation changes in the user's face and maintain the image of the eyewear at the eyewear placement position 322.

According to alternative embodiments, the eyewear fit visualization module 300 controls the characteristics of the displayed image of the eyewear (e.g., brightness, size, orientation) via movement of the display 308 to alter the distance between the display 308 and the second side 314 of the viewing surface 306. For example, as the user 304 increases the distance between the user 304 and the viewing surface 306, the eyewear fit visualization module 300 detects the change and triggers a corresponding rearward movement the display 308 away from the viewing surface 306 via movement mechanism 310 to compensate for any size and orientation changes in the user's face and maintain the image of the eyewear at the eyewear placement position 322. The movement mechanism 310 may include tracks, rails, or any mechanism used in conjunction with an actuator or other motor to facilitate movement of the display 308 with respect to the viewing surface 306. It should be understood that the movement mechanism 310 is not limited to translational movement of the display 308 toward and away from the viewing surface 306, but may include any suitable device operative to facilitate movement of the display 308 in three dimensions to change the rotational and/or directional movement of the display 308.

Figure 4B:
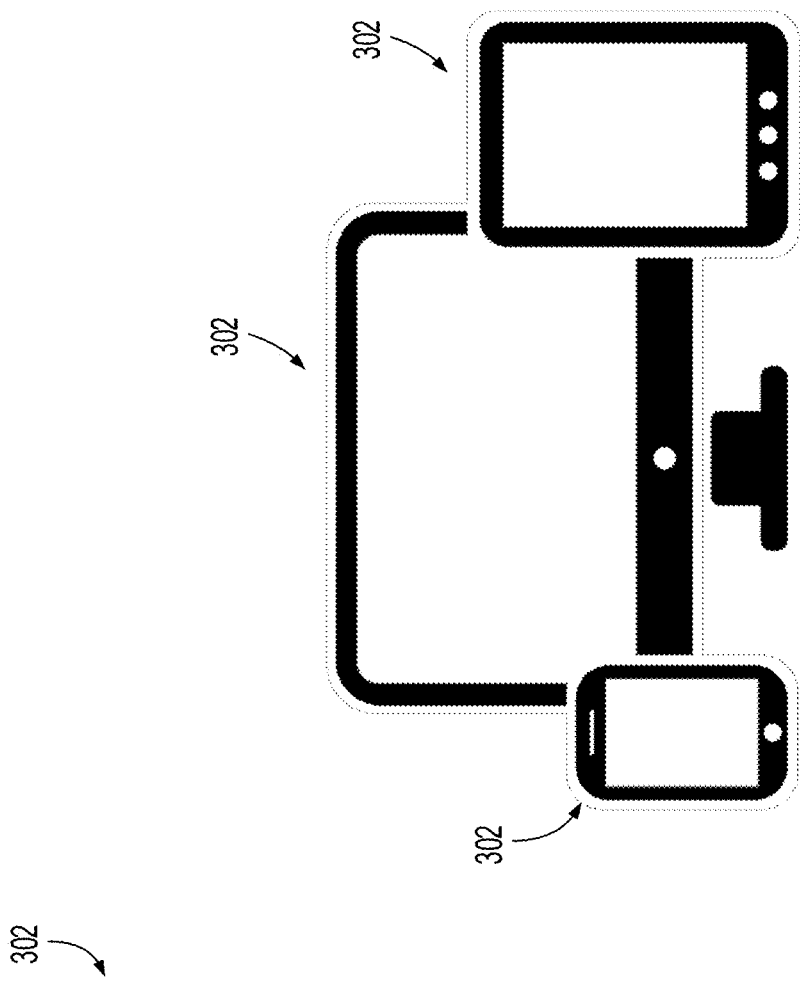
FIGS. 4A and 4B are front views of visualization devices according to various alternative embodiments of the disclosure provided herein.
Figure 4A:
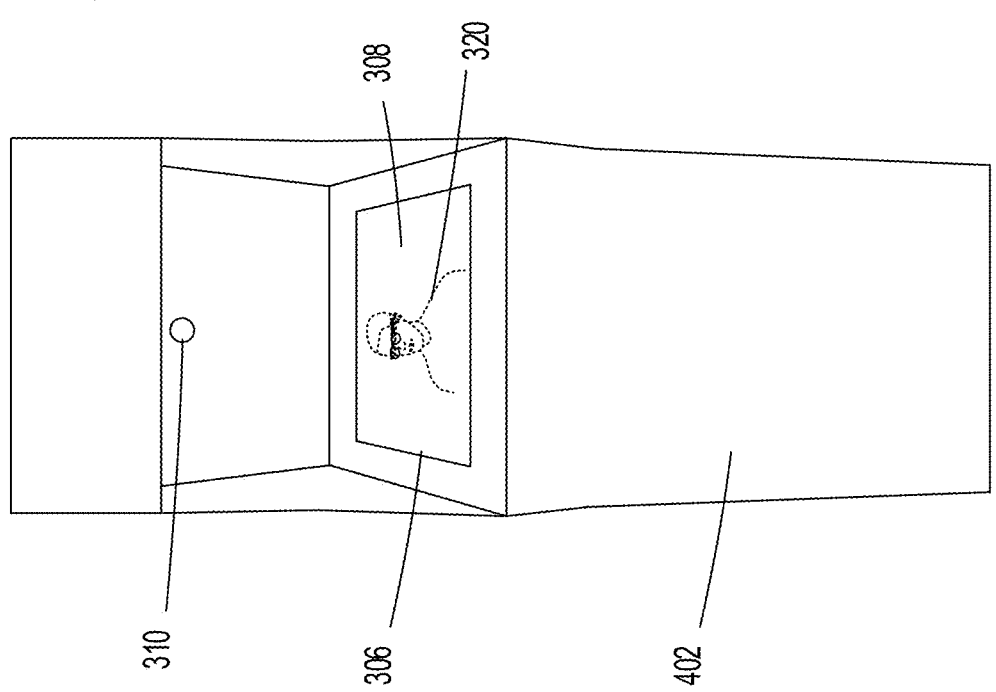

FIGS. 4A and 4B show alternative embodiments of the visualization device 302. In FIG. 4A, the visualization device 302 is configured as a kiosk 402 or booth. A camera 310 is positioned in front of the user 304 to capture one or more images of the user's face. In this embodiment, the viewing surface 306 is a screen positioned in front of the display 308. The screen is at least partially transparent so that the visualized image 320 includes a displayed image of the user's face from the camera 310. The image of the user's face may be a real-time video image provided by the camera 310, or may be a still image taken from the camera 310. Similarly, FIG. 4B shows various embodiments in which the visualization device 302 may be a smartphone, a tablet, or a desktop computer. Each of these devices incorporate a forward-facing camera, a screen, and a display positioned behind the screen. In these embodiments, the eyewear fit visualization module 300 controls the characteristics of the displayed image of the eyewear (e.g., brightness, size, orientation) via the lighting elements in the display 308.

Exemplary System Platform

As noted above, a system, according to various embodiments, is adapted to provide an eyewear visualization experience. Various aspects of the system's functionality may be executed by certain system modules, including the eyewear fit visualization module 300. The eyewear fit visualization module 300 is discussed in greater detail below.

Eyewear Fit Visualization Module

Figure 5:
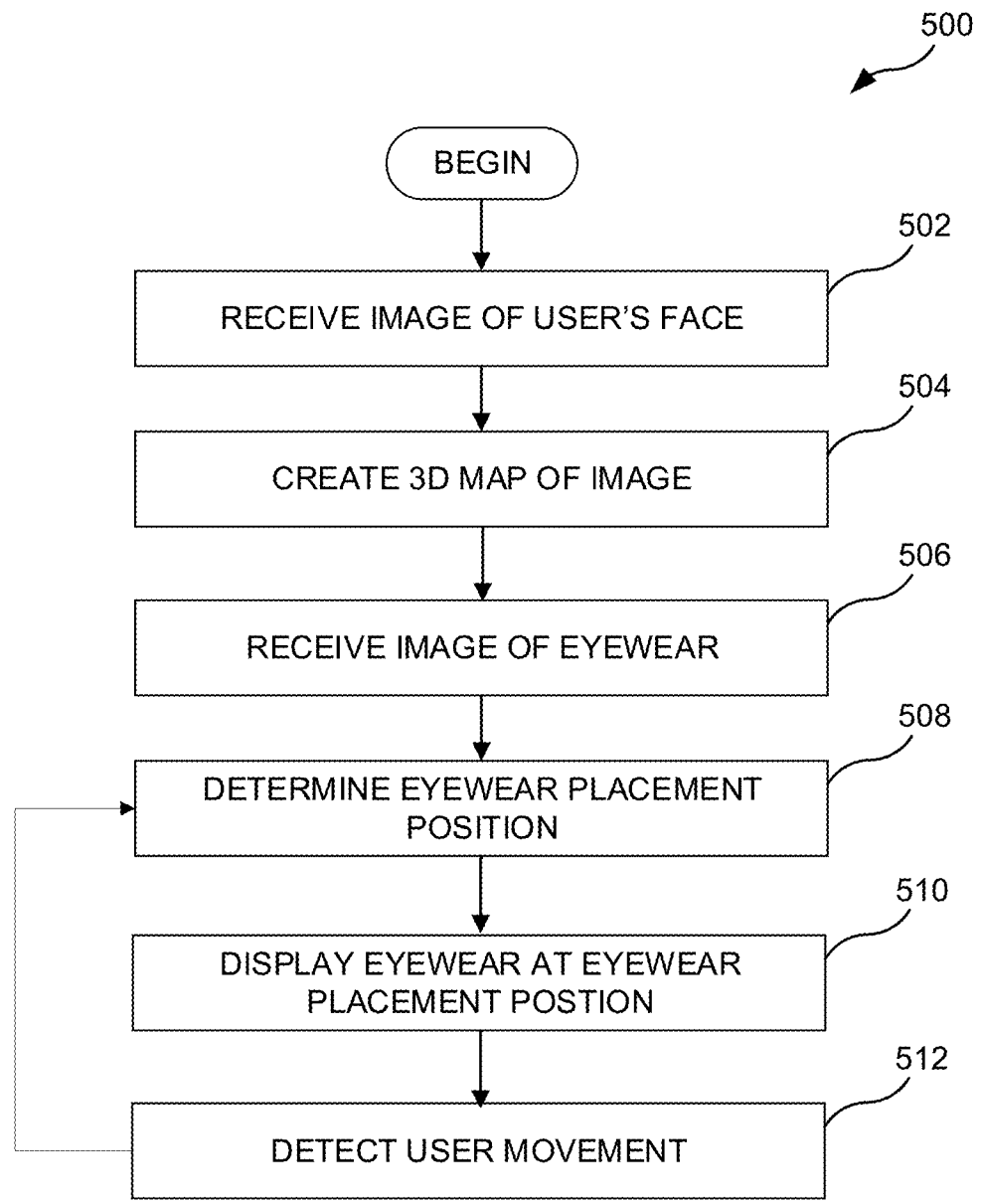
FIG. 5 depicts a flowchart that generally illustrates various steps executed by an eyewear fit visualization module according to various embodiments of the disclosure provided herein.

FIG. 5 is a flow chart of a routine 500 performed by an exemplary eyewear fit visualization module 300, which may, for example, run on the eyewear fit visualization server 120, or any other suitable computing device (such as the one or more visualization devices 302). In various embodiments, the routine 500 begins at operation 502, where the eyewear fit visualization module 300 receives an image of the user's face from the camera 310. The image may include one or more still images or may include a video or streaming image. At operation 504, the image of the user's face is transformed into a 3D map of the user's face. This process is described in detail below with respect to FIGS. 6-10.

At operation 506, the eyewear fit visualization module 300 receives or retrieves an image of eyewear that the user would like to visualize wearing. This eyewear may be selected by the user from a total group of available eyewear, or the eyewear fit visualization module 300 may determine provide the user with a subset of eyewear according to the user's eyewear size category (e.g., small, medium, or large) according to the determined points of contact between the eyewear and the user's face according to the methods described herein. The image of the eyewear may be stored along with any number of eyewear image files in the eyewear databases 140, or within a storage medium within the visualization device 302. The image of the eyewear may contain a 3D map of the eyewear similar to the 3D image of the user's face. Additionally or alternatively, the image of the eyewear may contain eyewear data that corresponds to all applicable measurements of the eyewear.

The routine 500 continues to operation 508, where the eyewear fit visualization module 300 determines the eyewear placement position 322. As described above, the eyewear placement position 322 is the location on the visualized image 320, which is displayed or reflected on the viewing surface 306, at which the image of the eyewear will be shown to simulate the wearing of the eyewear by the user 304. To determine the eyewear placement position 322, the eyewear fit visualization module 300 utilizes the 3D map of the eyewear and the 3D map of the image of the user's face to identify the contact points of the eyewear to the user's face. Based on the contact points of the eyewear to the user's face, the eyewear fit visualization module 300 may determine the exact location on the display 308 to provide the image of the eyewear according to the size, position, and orientation of the visualized image 320 of the user's face.

At operation 510, the eyewear fit visualization module 300 displays the eyewear image at the eyewear placement position 322. According to various embodiments, the eyewear fit visualization module 300 may continue to monitor movement of the user 304 using the camera 310. When movement is detected at operation 512, the routine 500 returns to operation 508 and continues as described above. In this manner, the eyewear fit visualization module 300 is capable of providing a realistic simulation of the eyewear being worn by the user as the eyewear remains in place at the accurately determined eyewear placement position 322 as the user moves in three-dimensional space.

Determining Proper Eyewear Fit

Limitations of Conventional Technology

Conventional computer vision technology is used to identify borders and features, or points, of a user's face. These points create a map that can be used to compare against other facial maps for facial recognition purposes. However, conventional facial recognition techniques commonly identify only 64 points, with 128 points being the maximum. Sixty-four points, and even 128 points, are insufficient to accurately render eyewear frames on a person's face or to provide eyewear fit information. Generally, 64 points will provide points around a person's eyes, eyebrows, nose ridge, and lips. When trying to accurately fit a pair of glasses on a person's face, having additional points on the person's cheek, brow, forehead, sides of the head, and ears is useful. Having brow and cheek points ensures that the lens of the eyewear does not rest on the cheeks instead of resting on the user's nose. A person's ears provide one of the more problematic areas to fit. The size and positioning of ears, the tops of the ears, and the area behind the ears are significant since the temples of the eyewear rest on or proximate to the ears. Consequently, establishing points around a user's ears when mapping the user's face for fit purposes is useful in providing a realistic fit simulation.

Solution for Projecting a 2D Image into a 3D Volume

The eyewear fit visualization system 100 provides a uniquely accurate fit of the eyewear images to the user's face using three-dimensional mapping techniques to acquire and utilize precise measurements of the user's facial features. To achieve this accuracy, a camera 310 is used to create an image of the user's face. According to some embodiments, the camera 310 takes a two-dimensional image and transforms the two-dimensional image into a three-dimensional map of the user's face. The three-dimensional map acts as a topographical map of the user's face that provides very precise dimensions of the user's facial features with respect to one another. Embodiments for creating these 3D maps will be described below with respect to FIGS. 6-10.

The various embodiments described herein for creating the 3D maps of the user's face and corresponding facial features utilize still or video images from the camera 310. Accordingly, it should be noted that the camera 310 may include any type of still or video camera for creating an image of the user's face. For example, the camera 310 may include a forward-facing camera such as those used on a smartphone, desktop or laptop computer, or tablet computing device. According to alternative embodiments described below, the camera 310 is a depth sensing camera having two camera lenses that are spaced apart. A depth sensing camera allows the eyewear fit visualization system 100 to compare the images from the adjacent camera lenses to determine the depth of the user's face and corresponding facial features. These depth measurements are then used to determine the measurements of the various facial features with respect to one another to create the 3D map of the user's face.

Whether using still, video, or depth camera images, the images of the user's face captured by the camera 310 are used to map the features of the user's face to create a representation that accurately positions the facial features of the user in a three-dimensional space. This 3D map is similar to a topographical map of the user's face, positioning the facial features of the user's face with respect to one another on a granular level, providing dimensions within a few millimeters of accuracy. The 3D mapping and subsequent processing is performed by the eyewear fit visualization module 300 to convert images to 3D point clouds, locate facial features, annotate the images with respect to the facial features, and identify the contact points of specific eyewear on the particular user's face, which will now be described in greater detail.

Figure 6:
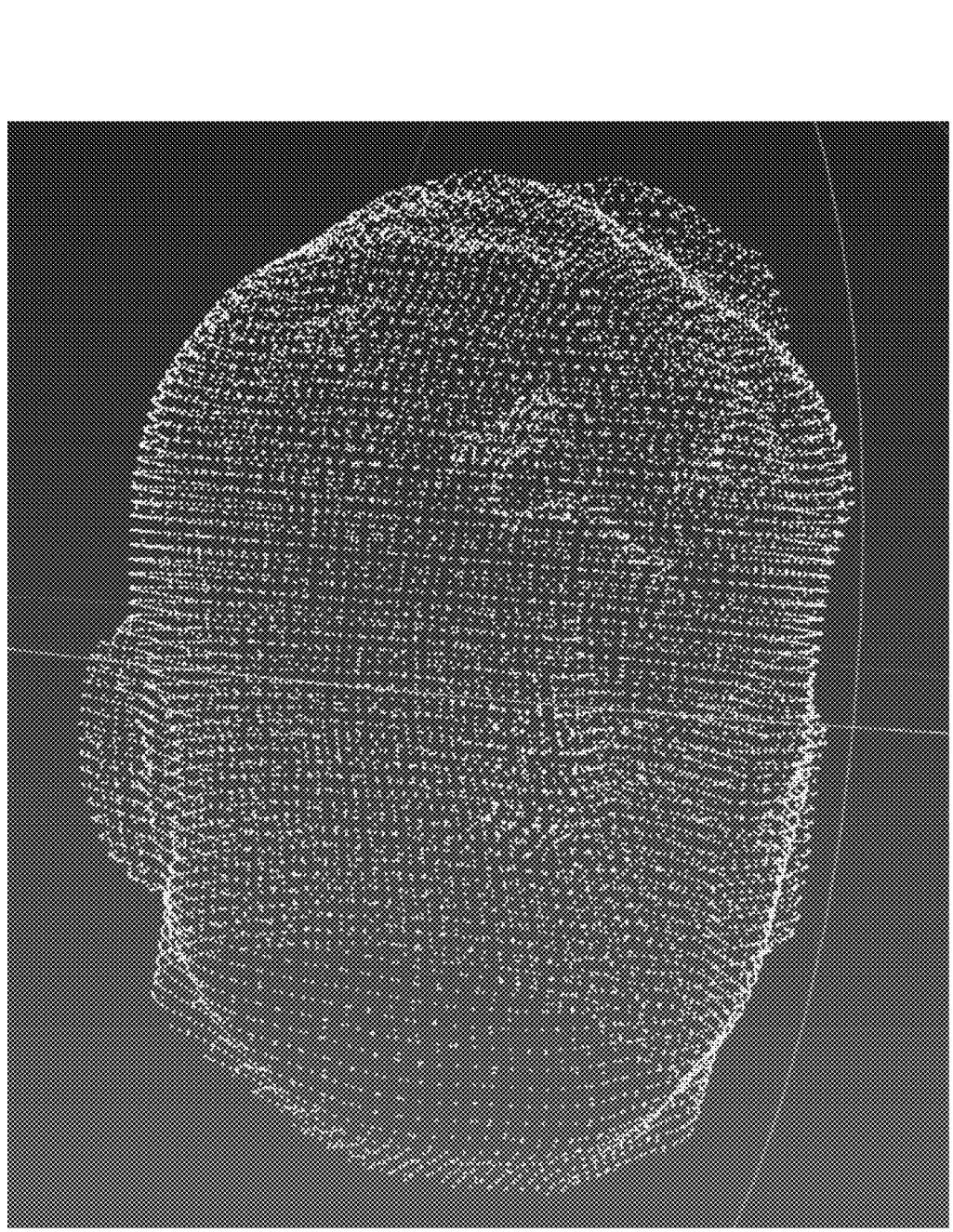
FIG. 6 shows an example of a point cloud of a user's face according to one embodiment of the disclosure provided herein.

According to one embodiment, the image data collection process begins with a three-dimensional head scan using the camera 310. This process may involve a short (e.g., approximately 20 seconds) video of the user's head, prompting the user 304 to rotate the user's head approximately 180 degrees starting with one ear facing the camera 310 and rotating until the other ear is facing the camera 310. Images may then be split out from the video, such as every frame being split to create a number of images corresponding to the various head poses during the 180-degree rotation. The eyewear fit visualization module 300 creates a point cloud from the image scan. FIG. 6 shows an example of a point cloud 602 created using the images from the camera 310.

Figure 7:
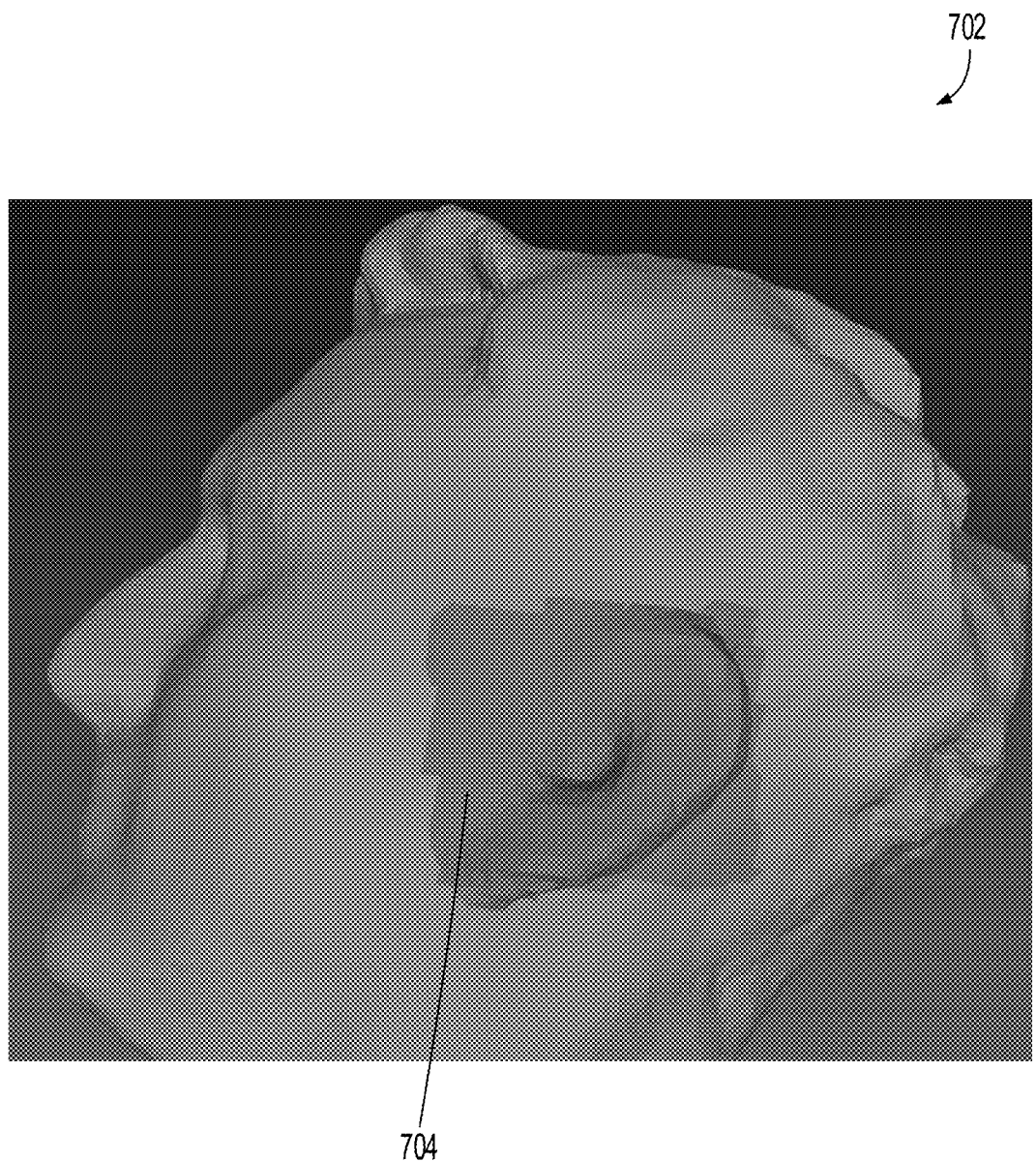
FIG. 7 shows an example of a mesh view with a grid positioned over an ear hole of a user according to one embodiment of the disclosure provided herein.
Figure 8:
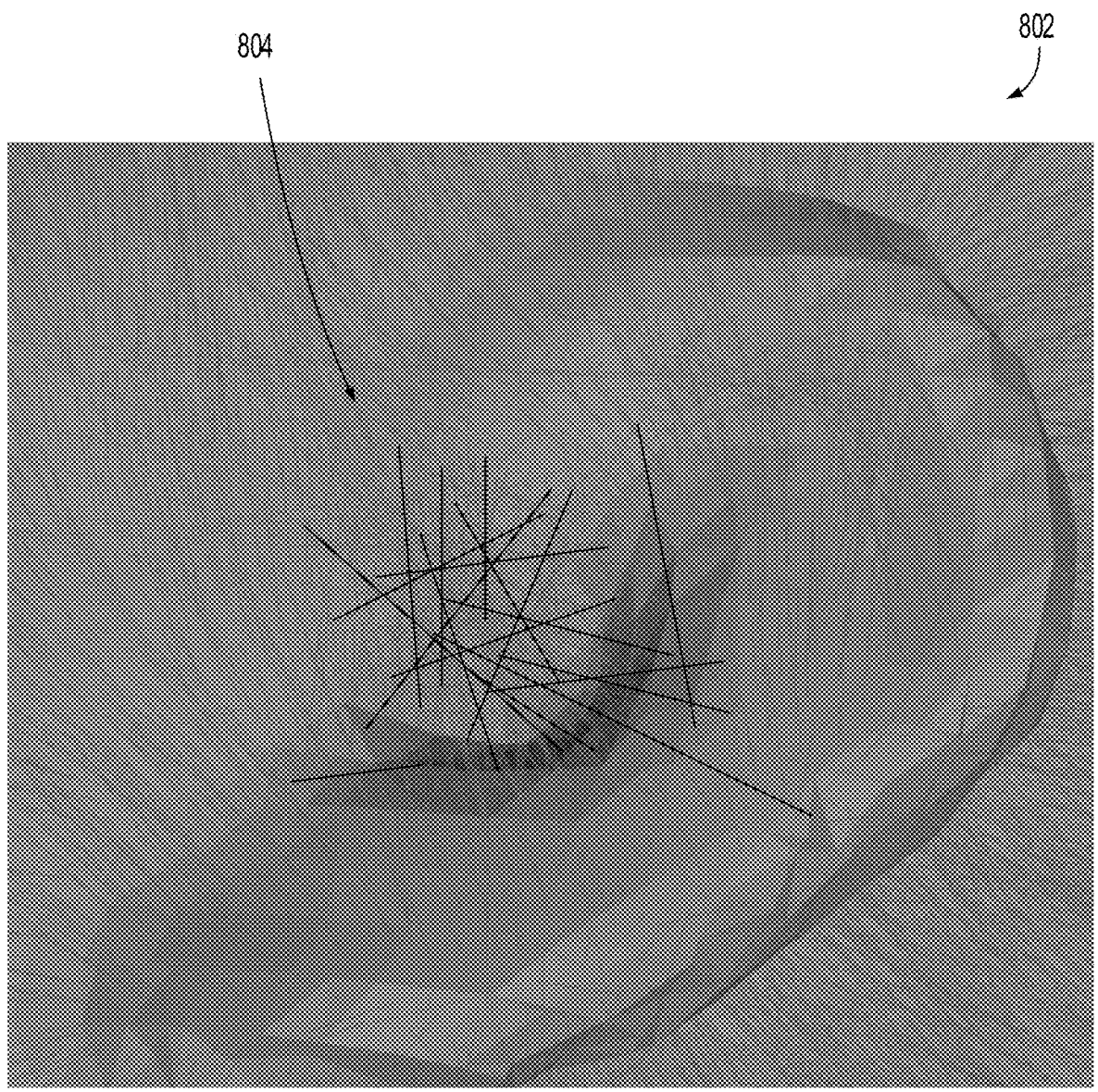
FIG. 8 shows an example of an enlarged mesh view with normal vectors shown over an ear hole of a user according to one embodiment of the disclosure provided herein.

From the point cloud 602, the various facial features are located. The ears, and specifically the ear holes, may be located first and used as an anchor from which the nose is located. According to one embodiment, the eyewear fit visualization module 300 searches for the ear hole. To do so, as seen in FIG. 7, a mesh view 702 is created and an N×N grid 704 is projected onto the mesh and slid around until an area inside of the grid (1) has a significant elevation decrease, and (2) the normal vectors in the given area are not consistent, meaning that the normal vectors point in substantially varying directions. FIG. 8 shows a normal vector view 802, which is a close up of the mesh view 702 of FIG. 7 with the normal vectors 804 shown. Only a small number of normal vectors 804 have been emphasized for clarity purposes.

The elevation decrease is due to the projection of the ear structure from the side of the user's head. Any decrease in elevation (e.g., from the surface inward do to the ear hole or from the ear down to the head) would indicate the probability that the area within the defined grid contains a facial feature. A significant change in the topography of the head surface inward, such as is the case with the ear hole, would create a substantial disorganization of the normal vectors. Consequently, a location on the user's facial point cloud that has a significant elevation decrease and a significant disorganization of the normal vectors would indicate a probability that the structure within the grid is an ear. Once the ear hole is identified, the system can trace lines emanating out from the center and trace the outline of the ear. When reaching the boundary of the ear, there is a decrease in elevation, from the earlobe and outermost ear border to the head. In this manner, a detailed ear map can be created, identifying all major parts of the ear. Once both ears are found and mapped, the nose is easily found as it is positioned between the ears and will have a significant elevation increase from the surface of the face. The eyes and other points of interest may be found in similar manners.

Figure 9:
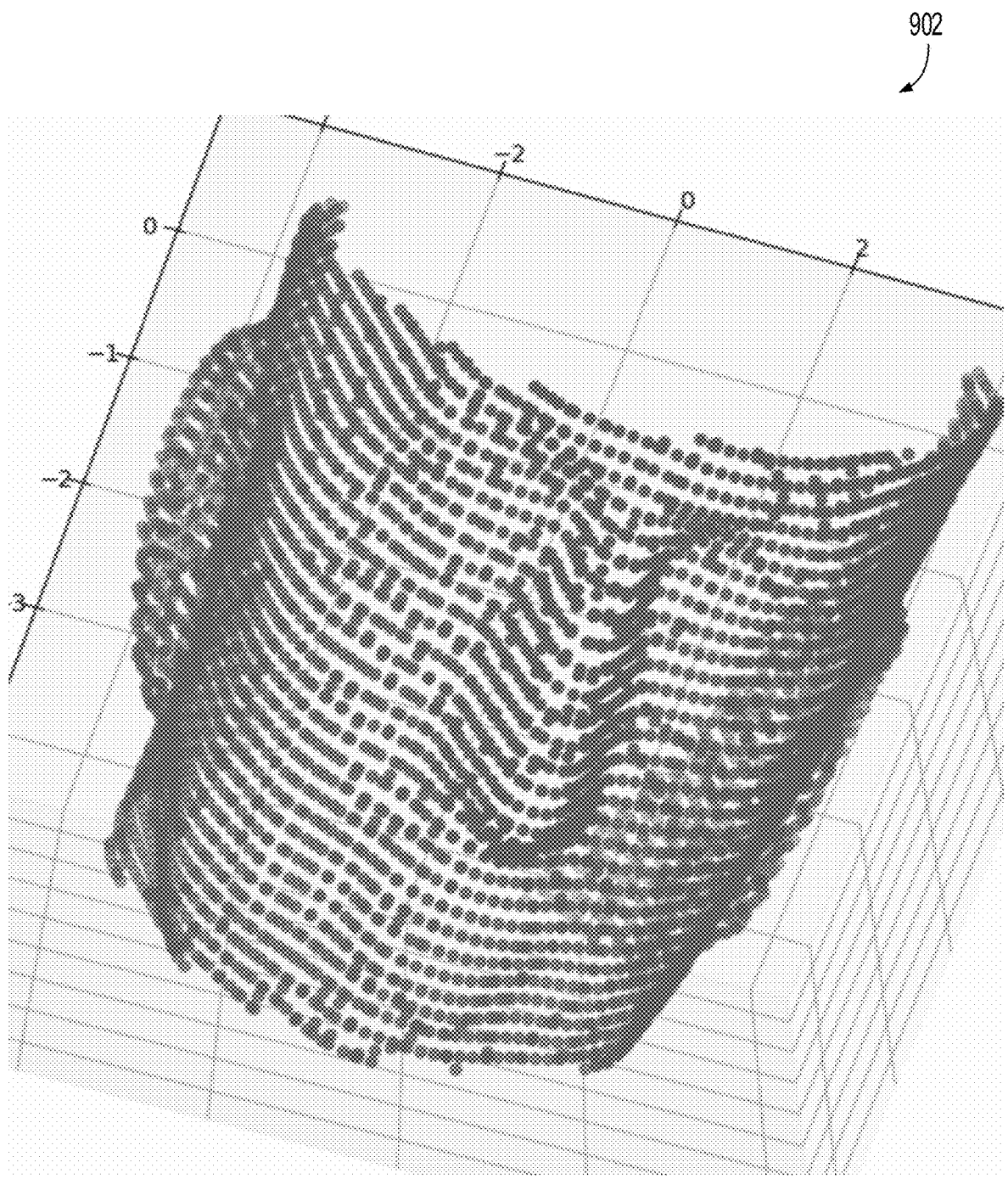
FIG. 9 shows an example of bounding box with points downsized and regularized according to one embodiment of the disclosure provided herein.

Once the points of interest corresponding to the user's facial features are known, the points are downsized and regularized, which is shown in view 902 of FIG. 9. A bounding box from the ears to the front of the face, encompassing the brows and cheeks may be created and used to annotate the images. According to one embodiment, the bounding box may include approximately 1500 points. The points from scan to scan (from user to user) should be in approximately the same location so that variation is associated with the person's actual facial features. As an example, regularization of the points would ensure that the approximately 40 points captured for a user's nose is in the same place for all scans and the only variation is to capture the different shaped noses in different scans of different users.

Figure 10:
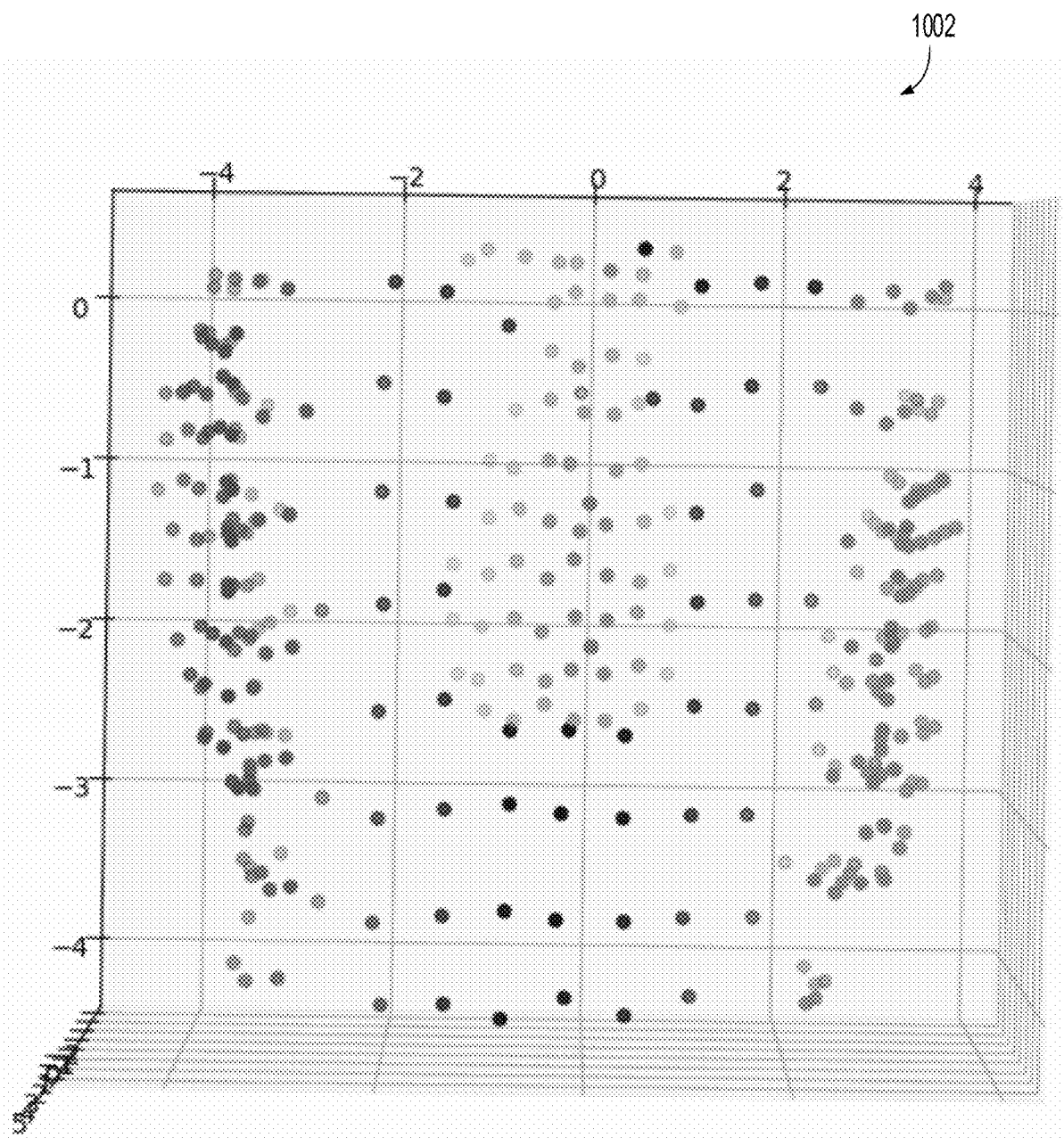
FIG. 10 shows an example of down sampled and regularized scans with points being used to annotate 2D images according to one embodiment of the disclosure provided herein.

Looking now at the view 1002 of FIG. 10, when the scans are down sampled and regularized, the points are used to annotate 2D images. The 2D images are created from still or video images from the camera 310 of the visualization device 302. According to one embodiment, conventional facial recognition technology may be initially used with the images to establish facial feature position and pose estimations, with the pose being the angle of the face to the camera. These estimations allow for mapping the down sampled scan to the same position and pose. When the images are annotated with the down sampled scans, the eyewear fit visualization module 300 may effectively take a 2D image and extrapolate into the 3D face volume so that variations can be identified and accurate measurements may be taken.

Utilizing this mapping data corresponding to the user's face and facial features, 3D map data associated with an eyewear selection may be retrieved from the one or more eyewear databases 140. The eyewear data is compared and analyzed with respect to the facial image data to predict contact points of the eyewear to the user's face. Knowing the exact dimensions of the eyewear in three-dimensional space, and knowing the precise location, shape, and size of the user's facial features (e.g., ears, nose, eyes, cheeks, brows) and corresponding dimensional data, the eyewear fit visualization module 300 can determine the exact locations where portions of the eyewear will contact the user's various facial features. Based on these locations, the eyewear fit visualization module 300 can virtually fit the eyewear to the user's face and provide a corresponding representation of the eyewear at this determined eyewear placement position on the reflection or display of the user's image, as described in further detail below.

The 3D mapping data associated with the eyewear and of the user's face will additionally allow the eyewear fit visualization module 300 to determine whether the eyewear will fit and how much pressure the user will experience at the determined contact points. The eyewear fit visualization system 100 may provide this information to the user via the visualization device 302. In order to estimate fit and to provide proper scale for the eyewear frames, the eyewear fit visualization module 300 utilizes a reference measurement. According to one embodiment, a user may be asked to place a credit card or other object of known dimensions on his or her forehead when an image is taken. According to an alternative embodiment, the transverse measurement of the user's eye is used as a reference. The transverse measurement of the eye is approximately 24.2 mm and only differs by approximately 1-2 mm from person to person. Using the eye as a reference measurement minimizes the actions required of the user (e.g., holding a credit card to their head) while providing an accurate reference within an error range of only +/−2 mm.

During a fit determination, if the eyewear fit visualization module 300 determines that the eyewear will contact the user's brow area or cheek, or if there the pressure applied at the determined contact points exceeds a predetermined threshold, the eyewear fit visualization module 300 may provide a notification to the user via the visualization device 302 that the selected eyewear is not compatible or may be uncomfortable when worn by the user. According to one embodiment, the eyewear fit visualization module 300 determines a user's eyewear size category according to the plurality of contact points of the eyewear to the user's face, selects a subset of eyewear for presentation to the user according to the eyewear size category, and provides the subset of eyewear to the user for visualization. Doing so effectively narrows down the number of frames that the user may virtually wear to only those that properly fit the user.

Alternative Solution for Projecting a 2D Image into a 3D Volume

According to one embodiment, the camera 310 is a depth sensing camera having two camera lenses that are spaced apart. A depth sensing camera allows the eyewear fit visualization system 100 to compare the images from the adjacent camera lenses to determine the depth of the user's face and corresponding facial features. These depth measurements are then used to determine the measurements of the various facial features with respect to one another to create the 3D map of the user's face. Using a depth sensing camera allows the point cloud to be generated in real time as the user moves around. The techniques discussed above may be used to identify the nose, ears, and other facial features. These points may be used to generate the bounding box, down sample and regularize the point cloud before determining the eyewear placement position 322. With the precise measurements from the depth sensing camera, reference measurements from the transverse of the eye or from an object of known dimensions is not necessary.

CONCLUSION

Many modifications and other embodiments of the invention will come to mind to one skilled in the art to which this invention pertains, having the benefit of the teaching presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented method for providing an eyewear visualization experience, the method comprising:
   receiving an image of a user's face positioned a distance from a first side of a viewing surface of a visualization device;
   utilizing the image of the user's face to create a 3D map of the image, the 3D map comprising a positioning of a plurality of features of the user's face according to a plurality of three-dimensional measurements associated with the plurality of features of the user's face;
   utilizing the 3D map to create a view of the user's face comprising a plurality of normal vectors;
   analyzing the normal vectors in a given area for a disorganization of the plurality of normal vectors;
   detecting the disorganization of the plurality of normal vectors indicative of a feature of the user's face to identify the position of a feature of the user's face;
   utilizing the identification of the position of the feature of the user's face, determining a position of remaining features of the user's face of the plurality of features;
   receiving an image of eyewear;
   utilizing the image of the eyewear and the locations of the plurality of features of the user's face, identifying a plurality of contact points of the eyewear to the user's face;
   utilizing the plurality of contact points of the eyewear to the user's face to position the image of the eyewear on the display according to a position of the visualized image of the user's face on the first side of the viewing surface; and
   displaying the image of the eyewear on a display positioned a distance from a second side of the viewing surface at the eyewear placement position.

2. The computer-implemented method of claim 1, wherein receiving the image of the user's face comprises receiving the image from a depth camera.

3. The computer-implemented method of claim 2, wherein the depth camera is secured to the visualization device.

4. The computer-implemented method of claim 1, wherein the image of eyewear comprises a 3D map of the eyewear, the 3D map of the eyewear comprises a plurality of three-dimensional measurements associated with a plurality of features of the eyewear.

5. The computer-implemented method of claim 1, further comprising:
   determining a user's eyewear size category according to the plurality of contact points of the eyewear to the user's face;
   selecting a subset of eyewear for presentation to the user according to the eyewear size category; and
   providing the subset of eyewear to the user for visualization.

6. The computer-implemented method of claim 1, wherein utilizing the plurality of contact points of the eyewear to the user's face to position the image of the eyewear on the display according to the position of the visualized image of the user's face comprises:
   determining the position of the visualized image of the user's face according to the distance of the user's face from the first side of the viewing surface and a positioning of the user's face with respect to the viewing surface and the display;
   determining positioning of a plurality of image contact points corresponding to the plurality of contact points on the visualized image of the user's face; and
   displaying the image of the eyewear on the display according to the positioning of the plurality of image contact points and a position of the display at the distance from the second side of the viewing surface.

7. The computer-implemented method of claim 6, wherein displaying the image of the eyewear on the display according to the positioning of the plurality of image contact points and the position of the display at the distance from the second side of the viewing surface comprises:
   determining the distance from the second side of the viewing surface;
   determining a size and orientation of the image of the eyewear to display;
   displaying the image of the eyewear on the display at the determined distance from the second side of the viewing surface and according to the determined size and orientation.

8. The computer-implemented method of claim 7, further comprising:
   detecting a change in the distance of the user's face from the first side of the viewing surface; and
   in response to detecting the change in the distance of the user's face from the first side of the viewing surface, determining the distance from the second side of the viewing surface;
   determining the size and orientation of the image of the eyewear to display;

displaying the image of the eyewear on the display at the determined distance from the second side of the viewing surface and according to the determined size and orientation.

9. The computer-implemented method of claim 6, wherein determining positioning of a plurality of image contact points corresponding to the plurality of contact points on the visualized image of the user's face comprises:
utilizing the distance of the user's face from the first side of the viewing surface and a position of one or more of the user's eyes, determining a configuration of the visualized image of the user's face from a perspective of the one or more of the user's eyes; and
determining the positioning of the plurality of image contact points according to the position of the visualized image of the user's face and the configuration of the visualized image of the user's face.

10. The computer-implemented method of claim 1, wherein the viewing surface comprises a reflective surface and the visualized image comprises a reflection of the user's face.

11. The computer-implemented method of claim 1, wherein the viewing surface comprises a screen positioned in front of the display, wherein the screen is at least partially transparent, and wherein the visualized image comprises a displayed image of the user's face utilizing a camera adjacent to or coupled to the visualization device.

12. An eyewear visualization system, comprising:
a visualization device comprising a viewing surface that is at least partially reflective and at least partially transmissive and having a first side a second side opposite the first side;
at least one camera configured to capture an image of a user's face positioned a distance from the first side of the viewing surface;
a display positioned adjacent to and a determined distance from the second side of the viewing surface;
a processor communicatively coupled to the at least one camera and the display, and operative to:
receive the image of the user's face from the at least one camera;
utilize the image of the user's face to create a 3D map of the image, the 3D map comprising a positioning of a plurality of features of the user's face according to a plurality of three-dimensional measurements associated with the plurality of features of the user's face;
utilize the 3D map to create a view of the user's face comprising a plurality of normal vectors;
analyze the normal vectors in a given area for a disorganization of the plurality of normal vectors;
detect the disorganization of the plurality of normal vectors indicative of a feature of the user's face to identify the position of a feature of the user's face;
utilize the identification of the position of the feature of the user's face to determine a position of remaining features of the user's face of the plurality of features;
receive an image of eyewear;
utilize the image of the eyewear and the 3D map of the image of the user's face to determine an eyewear placement position corresponding to a positioning of a reflected image of the user's face on the first side of the viewing surface; and
display the image of the eyewear on the display at an eyewear placement position according to the determined distance of the display from the second side of the viewing surface.

13. The eyewear visualization system of claim 12, wherein the image of eyewear comprises a 3D map of the eyewear, the 3D map of the eyewear comprises a plurality of three-dimensional measurements associated with a plurality of features of the eyewear.

14. The eyewear visualization system of claim 13, wherein determining the eyewear placement position corresponding to the positioning of the reflected image of the user's face on the first side of the viewing surface comprises:
utilizing the 3D map of the eyewear and the 3D map of the image of the user's face to identify a plurality of contact points of the eyewear to the user's face; and
utilizing the plurality of contact points of the eyewear to the user's face to position the image of the eyewear on the display according to a position of the reflected image of the user's face.

15. The eyewear visualization system of claim 14, wherein utilizing the plurality of contact points of the eyewear to the user's face to position the image of the eyewear on the display according to the position of the reflected image of the user's face comprises:
determining the position of the reflected image of the user's face according to the distance of the user's face from the first side of the viewing surface and a positioning of the user's face with respect to the viewing surface and the display;
determining positioning of a plurality of image contact points corresponding to the plurality of contact points on the reflected image of the user's face; and
displaying the image of the eyewear on the display according to the positioning of the plurality of image contact points and a position of the display at the determined distance from the second side of the viewing surface.

16. The eyewear visualization system of claim 15, wherein displaying the image of the eyewear on the display according to the positioning of the plurality of image contact points and the position of the display at the determined distance from the second side of the viewing surface comprises:
determining the distance from the second side of the viewing surface;
determining a size and orientation of the image of the eyewear to display;
displaying the image of the eyewear on the display at the determined distance from the second side of the viewing surface and according to the determined size and orientation.

17. The eyewear visualization system of claim 16, further comprising:
detecting a change in the distance of the user's face from the first side of the viewing surface; and
in response to detecting the change in the distance of the user's face from the first side of the viewing surface, determining the distance from the second side of the viewing surface;
determining the size and orientation of the image of the eyewear to display;
displaying the image of the eyewear on the display at the determined distance from the second side of the viewing surface and according to the determined size and orientation.

18. The eyewear visualization system of claim 15, wherein determining positioning of a plurality of image contact points corresponding to the plurality of contact points on the reflected image of the user's face comprises:

utilizing the distance of the user's face from the first side of the viewing surface and a position of one or more of the user's eyes, determining a configuration of the reflected image of the user's face from a perspective of the one or more of the user's eyes; and determining the positioning of the plurality of image contact points according to the position of the reflected image of the user's face and the configuration of the reflected image of the user's face.

19. An eyewear visualization system, comprising:
a visualization device comprising a screen having a first side a second side opposite the first side;
at least one camera configured to capture an image of a user's face positioned a distance from the first side of the screen;
a display positioned adjacent to and a distance from the second side of the screen;
a processor communicatively coupled to the at least one camera and the display, and operative to:
receive the image of the user's face from the at least one camera;
utilize the image of the user's face to create a 3D map of the image, the 3D map comprising a positioning of a plurality of features of the user's face according to a plurality of three-dimensional measurements associated with the plurality of features of the user's face;
utilize the 3D map to create a mesh view of the user's face comprising a plurality of normal vectors;
analyze the normal vectors in a given area for a disorganization of the plurality of normal vectors;
detect the disorganization of the plurality of normal vectors indicative of a feature of the user's face to identify the position of a feature of the user's face;
utilizing the identification of the position of the feature of the user's face and the mesh view, determine a position of remaining features of the user's face of the plurality of features;
receive an image of eyewear;
utilizing the image of the eyewear and the locations of the plurality of features of the user's face, determine an eyewear placement position corresponding to a positioning of a displayed image of the user's face on the first side of the screen; and
display the image of the eyewear on the display at an eyewear placement position.

20. The eyewear visualization system of claim 19, wherein the image of eyewear comprises a 3D map of the eyewear, the 3D map of the eyewear comprises a plurality of three-dimensional measurements associated with a plurality of features of the eyewear.

21. The eyewear visualization system of claim 20, wherein determining the eyewear placement position corresponding to the positioning of the displayed image of the user's face on the first side of the screen comprises:
utilizing the 3D map of the eyewear and the locations of the plurality of features of the user's face to identify a plurality of contact points of the eyewear to the user's face; and
utilizing the plurality of contact points of the eyewear to the user's face to position the image of the eyewear on the display according to a position of the displayed image of the user's face.

22. The eyewear visualization system of claim 21, wherein utilizing the plurality of contact points of the eyewear to the user's face to position the image of the eyewear on the display according to the position of the displayed image of the user's face comprises:
determining the position of the displayed image of the user's face according to the distance of the user's face from the first side of the screen and a positioning of the user's face with respect to the screen and the display;
determining positioning of a plurality of image contact points corresponding to the plurality of contact points on the displayed image of the user's face; and
displaying the image of the eyewear on the display according to the positioning of the plurality of image contact points and a position of the display at the distance from the second side of the screen.

23. The eyewear visualization system of claim 22, wherein displaying the image of the eyewear on the display according to the positioning of the plurality of image contact points and the position of the display at the distance from the second side of the screen comprises:
determining the distance from the second side of the screen;
determining a size and orientation of the image of the eyewear to display;
displaying the image of the eyewear on the display at the determined distance from the second side of the screen and according to the determined size and orientation.

24. The eyewear visualization system of claim 23, further comprising:
detecting a change in the distance of the user's face from the first side of the screen; and
in response to detecting the change in the distance of the user's face from the first side of the screen,
determining the distance from the second side of the screen;
determining the size and orientation of the image of the eyewear to display;
displaying the image of the eyewear on the display at the determined distance from the second side of the screen and according to the determined size and orientation.

* * * * *